United States Patent [19]

Harris

[11] 3,950,624

[45] Apr. 13, 1976

[54] AUTOMATIC RESET TIMER WITH LATCH CONTROLLED CAM OPERATOR

[75] Inventor: John L. Harris, Clearwater, Fla.

[73] Assignee: Deltrol Corporation, Bellwood, Ill.

[22] Filed: July 19, 1974

[21] Appl. No.: 489,981

[52] U.S. Cl. .............. 200/39 R; 74/3.5
[51] Int. Cl.² .............. H01H 7/08; F16H 5/74
[58] Field of Search .............. 74/3.5, 3.52, 3.54; 200/35 R, 38 R, 39 R, 39 A; 335/63–65, 74, 75, 77

[56] References Cited

UNITED STATES PATENTS

| | | | |
|---|---|---|---|
| 2,957,962 | 10/1960 | Hanstein et al. | 335/74 |
| 3,238,328 | 3/1966 | Harris | 335/64 |
| 3,489,015 | 1/1970 | Harris | 200/39 R X |

*Primary Examiner*—James R. Scott

[57] ABSTRACT

A multiple switch automatic reset timer in which the switches are located in the back of the timer and have operators angularly spaced about a main bearing axis. A clutch operator is also angularly spaced from the switch operators. A spring return timing gear on the main bearing axis drives a spring tensioner also carried on the main bearing axis. This stores power in the spring which is released at the timed-out point for driving a cam wheel carried on the main bearing axis. This actuates the switch operators and also releases the clutch allowing the timing gear to reset. The cam wheel is maintained in the timed-out position by a latch engaging the spring tensioner. This latch is released by a solenoid operated wheel carried on the main bearing axis. This wheel may also operate the clutch and one or all of the switches. The wheel configuration determines the type of action given by the timer. Provision is made for on delay, off delay, interval, instantaneous switch operation and many other combinations.

15 Claims, 20 Drawing Figures

FIG. 1
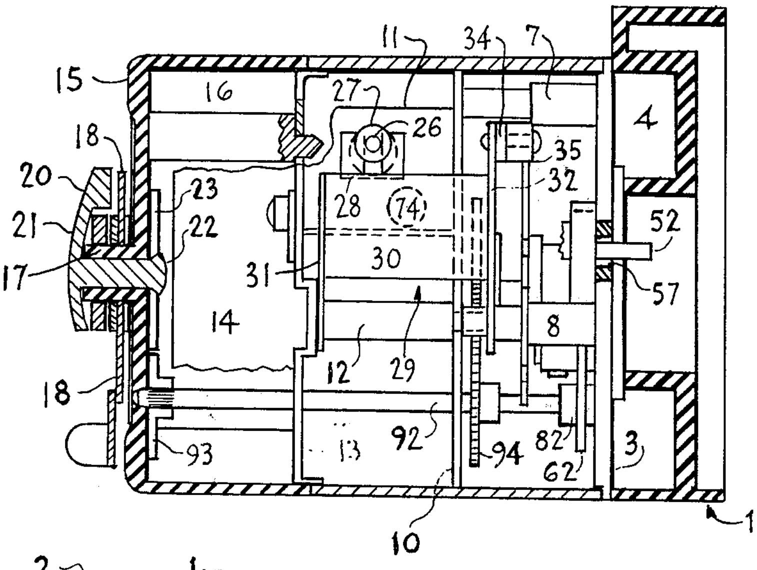
FIG. 2
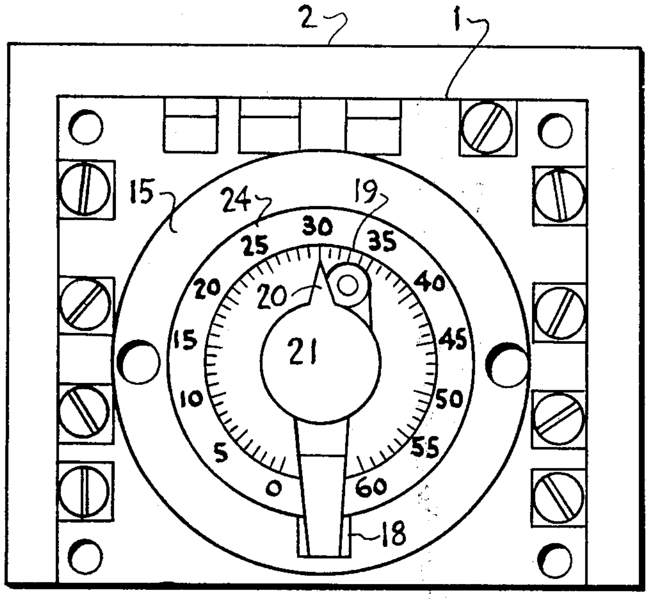
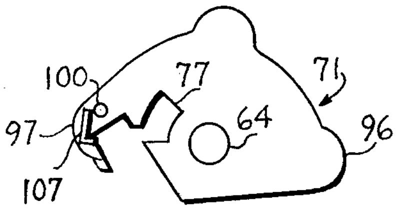
FIG. 6
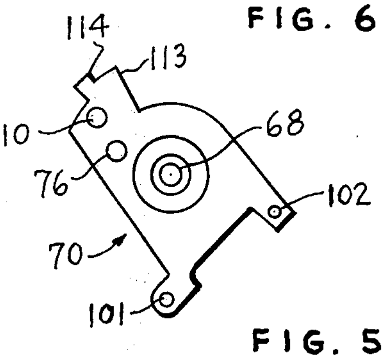
FIG. 5
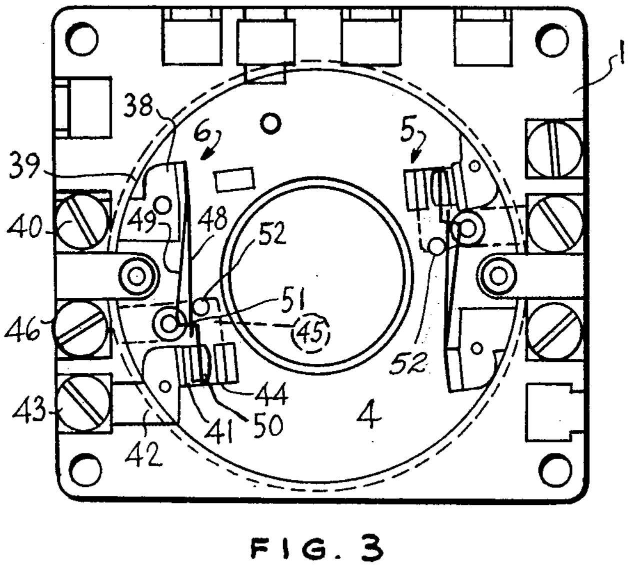
FIG. 3
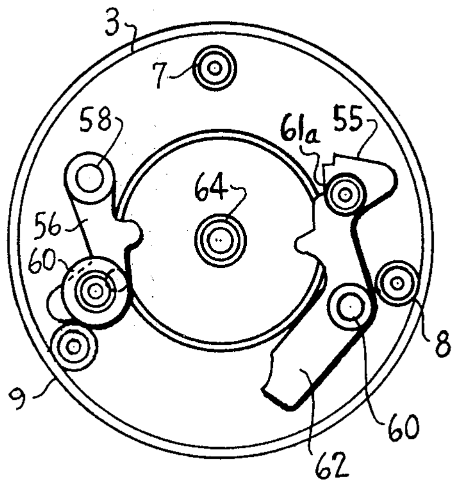
FIG. 4

FIG. 7
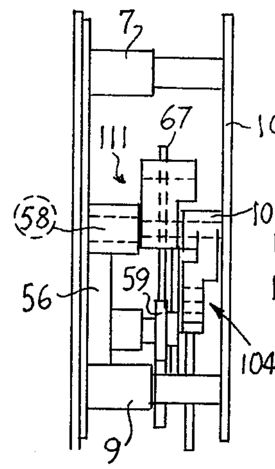
FIG. 8
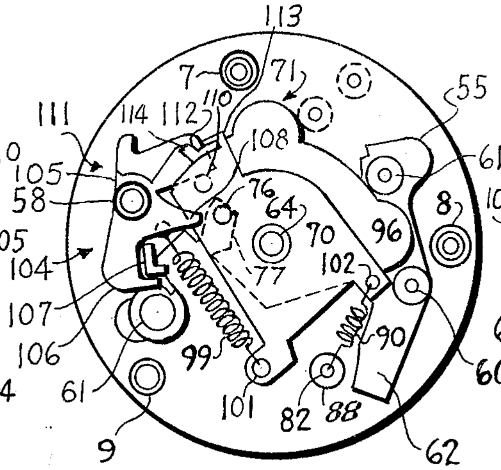
TIMING
FIG. 9
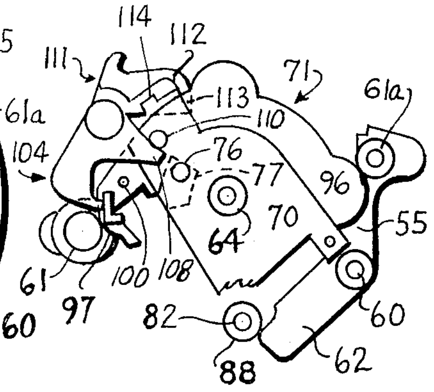
TIMED OUT
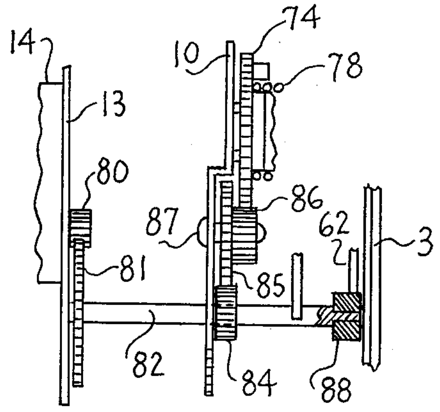
FIG. 10
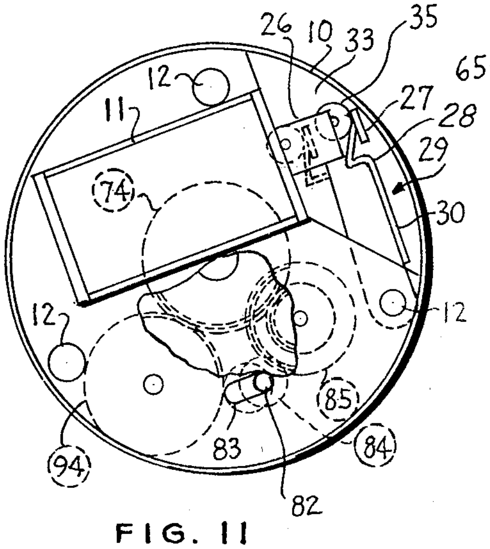
FIG. 11
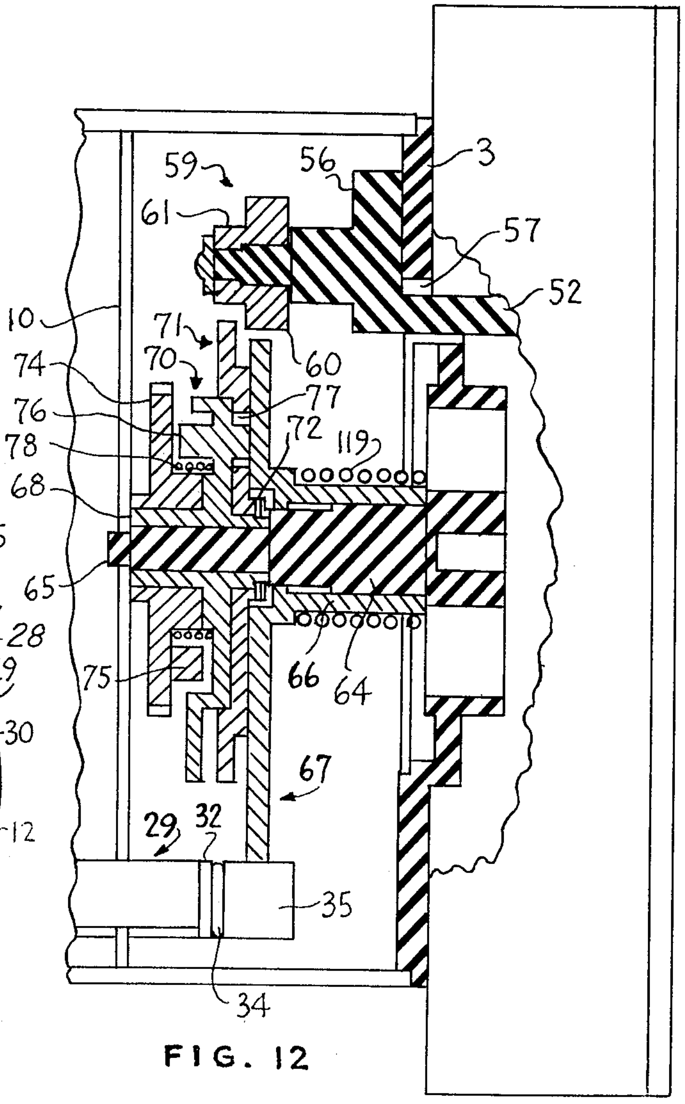
FIG. 12

SOLENOID-OUT

TIMING MECHANISM LATCHED IN TIMED OUT POSITION

SOLENOID-IN

TIMING MECHANISM IN TIMING POSITION

SOLENOID - OUT

SOLENOID - IN

AUTOMATIC RESET TIMER WITH LATCH CONTROLLED CAM OPERATOR

CROSS REFERENCE TO RELATED APPLICATION

The general construction of the timer mechanism shown in this application is the subject matter of my application Ser No. 333,767 filed Feb. 20, 1973. This application shows a different mode of control by the solenoid.

BACKGROUND OF THE INVENTION

Prior art automatic reset timers include a spring return timing gear driven by an electric motor through a solenoid operated clutch which when released allows the gear to reset to its starting position. They also include "delay" switches which are operated to a timed-out position at the end of the cycle, and "instantaneous" switches which are operated directly by the solenoid. External wiring of these switches in different combinations gives different timing functions such as interval timing and delay timing. Such timers are also built with "on delay" clutches which release when the solenoid is deenergized and "off delay" clutches which release when the solenoid is energized.

My copending application Ser. No. 333,767 shows an improved form of automatic reset timer including multiple switches having integral terminals spaced around a main bearing axis at the back of the timer. Instead of having delay and instantaneous switches as in prior art devices, the switch operation is convertible by external mode selectors. Setting the mode selector for each switch determines how the switch reacts to the solenoid controller. The clutch is also provided with a separate mode selector. Setting of the mode selectors in different combinations provides a large variety of "models" all from the same timer. This unit is intended primarily for distributor sales and permits reduction of distributor inventories.

My U.S. Pat. No. 3,489,015, issued Jan. 13, 1970, discloses a single switch automatic reset timer in which both the switch response and clutch response to solenoid control are determined by the configuration of a solenoid operated lever. A wide variety of timer models can be made from the same basic mechanism simply by selecting the solenoid lever.

BRIEF SUMMARY OF THE INVENTION

This invention relates in general to electromechanical controls and more particularly to timers of the automatic reset type.

The primary object of the invention is to provide a simplified timer having the construction features of that shown in my copending application, for applications where field convertibility is not needed. Such applications are in the O.E.M. field such as where a machinery manufacturer purchases a large number of a single model for incorporation into his product.

In accordance with the invention, a single main bearing axis supports the timing and switch operating mechanism and also supports a reciprocating master control means comprising a solenoid operated wheel. A holding means comprising a latch holds the switch operating mechanism in the timed-out position. This latch is released to return the mechanism to timing position by rotation of the wheel. This wheel also actuates the timer clutch. Different surfaces on the wheel provide for either clockwise or counterclockwise rotation of the wheel when the solenoid pulls in. Also different surfaces on the wheel periphery actuate the latch, clutch, and switch operators. Different combinations of surfaces on the wheel periphery provide different models of timers with no changes required in the remainder of the timer construction.

Other objects of the invention will appear from the following detailed description and appended claims.

DETAILED DESCRIPTION OF DRAWINGS

FIG. 1 is a side sectional view of a complete automatic reset timing device embodying the invention;

FIG. 2 is a front external view of a complete timer;

FIG. 3 is a view of the switch base with the rest of the mechanism removed and showing the switch and terminal construction;

FIG. 4 is a front view of the mechanism base with the switch operators installed and before the installation of the timer mechanism components;

FIG. 5 is a front view of the spring tensioner;

FIG. 6 is a front view of the spring wheel;

FIG. 7 is a left hand side view of the timer mechanism;

FIG. 8 is a front view of this same mechanism showing the parts in the positions assumed during a time cycle;

FIG. 9 is a view similar to FIG. 8 but showing the positions of the parts after the timing cycle has been completed;

FIG. 10 is a fragmentary side view of the gearing and clutch mechanism;

FIG. 11 is a front view of the center section of the mechanism showing the solenoid and clutch mechanism;

FIG. 12 is an enlarged sectional view showing the mounting on the various parts of the main bearing axis of the timer mechanism;

FIGS. 13 and 14 show the solenoid wheel setup for an on delay timer, FIG. 13 showing the positions of the parts when the solenoid is out, and FIG. 14 showing the positions assumed when the solenoid is in;

FIGS. 15 and 16 show the solenoid wheel arrangement for an off delay timer, FIG. 15 showing the parts when the solenoid is out, and FIG. 16 showing the parts when the solenoid is in;

FIGS. 17 and 18 show the solenoid wheel arrangement for an interval timer, FIG. 17 showing the parts in the positions assumed when the solenoid is out, and FIG. 18 showing the positions assumed when the solenoid is in;

FIGS. 19 and 20 show the solenoid wheel arrangement for a combination interval and on delay timer, FIG. 19 showing the parts with the solenoid out, and FIG. 20 showing the parts with the solenoid in.

DETAILED DESCRIPTION OF THE INVENTION

Figure 13:
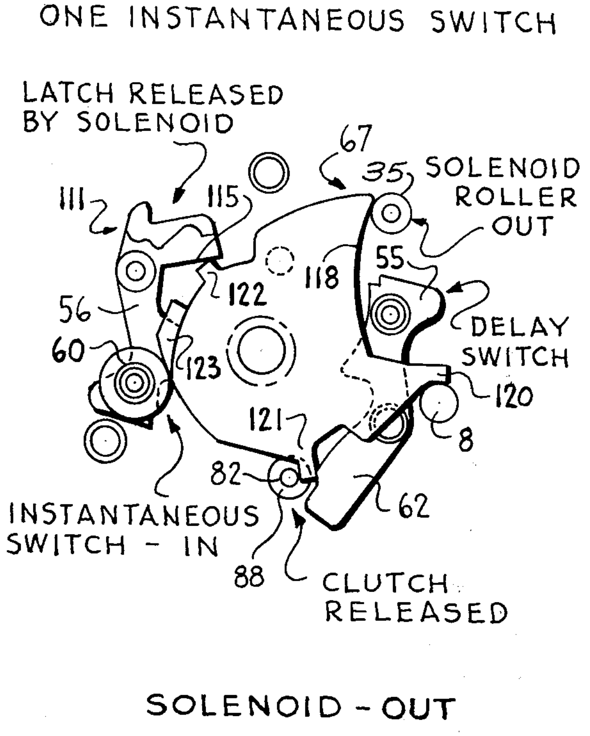

Referring to FIGS. 1, 2, 3 and 4, reference character 1 indicates a combination mounting base and switch housing which is mounted on an insulating barrier 2 and which supports a mechanism base 3. Base 1 may be identical to that shown in greater detail in my copending application Ser. No. 333,767. This base includes a dough-nut shaped recess 4 receiving switches 5 and 6 which are identical in construction and mounted on opposite sides of the base. The mechanism base 3 (as shown in FIG. 4) is formed of insulative material and supports three forwardly extending spacers 7, 8 and 9 which in turn support a solenoid plate 10 (FIG. 1). This plate carries a solenoid 11 and includes spacers 12 attached to the spacers 7, 8 and 9, the spacers 12 in turn supporting a motor plate 13. This motor plate 13 carries the timer motor 14 and also supports a front housing member 15. This front housing member 15 is preferrably moulded, including integral spacers 16 and a forwardly extending hub 17 which carries an adjustable pointer 18 having a forwardly extending reset stop 19 which is in the path of an elapsed time pointer 20. The pointer 20 is carried by a skirt 21 having a moulded shaft 22 extending through hub 17 to the interior of front housing 15 and carrying a gear 23. The housing 15 also carries a dial 24 which is mounted below the pointers 18 and 20.

The solenoid and lever construction is identical to that shown in my copending application. The solenoid 11 is mounted on the plate 10 and includes a plunger 26 extending to the right as shown in FIG. 11. This plunger has a T-shaped end portion 27 extending between ears 28 of a solenoid lever generally indicated as 29. This lever is formed with a cross piece 30 which carries the ears 28 and is formed with a left hand leg 31 and a right hand leg 32 as seen in FIG. 1. The left hand leg 31 fits over one of the motor plate spacers 12 and the right hand leg 32 is pivotally supported by spacer 8 carried by the mechanism base 3. As shown in FIG. 11, the solenoid plate 10 is cut away at 33 for allowing the cross piece 30 to extend past the solenoid plate 10. The right hand leg 32 extends upwardly as shown in FIG. 1 and carries a stud 34 which extends rearwardly and carries a roller 35. It will be apparent that when the solenoid is deenergized as shown in full lines in FIG. 11, the roller 35 is in its full line position as shown. When the solenoid is energized, the plunger pulls to the left rotating the solenoid lever 29 counterclockwise and moving the roller 35 to the dotted line position shown.

Referring now to FIG. 3, switches 5 and 6 are identical. These switches are mounted on the bottom wall of the dough-nut shaped recess 4. Each switch consists of a switch blade bracket 38 which a suitably mounted on the bottom wall of the recess 4 and extends through the outer wall 39 into the terminal area receiving a terminal screw 40. Each switch also includes a timed-out contact 41 carried by a bracket 42 which is mounted on the bottom wall and extends through the outer wall 39 into the terminal area receiving terminal screw 43. Each switch also includes a timing contact 44 carried by a terminal bracket 45. This terminal bracket is preferrably mounted on the outside of the bottom wall of space 4, having one portion extending through a suitable opening in the bottom wall and carrying contact 44 and having another portion extending into the terminal area receiving a terminal screw 46. The contact bracket 38 carries two blades 48 and 49, the blade 49 carrying a double contact 50 located between the timed-out contact 41 and the timing contact 44. This blade is formed with an offset portion 51 through which a reduced portion of blade 48 extends. Blade 49 serves to conduct the current and is biased outwardly toward engagement with the timed-out contact 41. Blade 48 does not carry the current but serves as an operator for blade 49. This blade 48 is biased inwardly tending to pull blade 49 into engagement with the timing contact 44. When blade 48 is free, its bias overcomes the opposite bias of blade 49 and pulls blade 49 inwardly causing engagement of contact 50 with timing contact 44. However when blade 48 is pushed outwardly as by an operating pin 52, it will allow corresponding movement of blade 49 thus disengaging contact 44 and engaging contact 41.

The operating pins 52 which actuate these switches are carried by switch operators 55 and 56 which are mounted on the front of the mechanism base 3 (FIG. 4). As shown in FIGS. 1 and 12, the operating pins 52 extends through slots 57 in the mechanism base. The switch operator 56 is pivoted to a stud 58 (FIG. 4) extending outwardly from the mechanism base and carries a roller 59 (FIG. 12) formed with a major diameter 60 and a minor diameter 61. This roller is freely supported on a stud which is integral with the switch operator. The operating pin 52 for the switch 5 is carried on switch operator 55 which is pivoted to the mechanism base at 60 (FIG. 4). This switch operator carries a roller 61*a* and is formed with a downwardly extending arm 62 which serves as a clutch operator as will be described.

Referring now to FIG. 12, the mechanism base is formed with an outwardly extending stud or main bearing axis 64 having a reduced portion 65 extending into the solenoid plate 10. The rear portion of the stud 65 is relatively large in diameter and carries hub 66 of a solenoid wheel or master control means generally indicated as 67. The portion of the stud 64 forward of wheel 67 is reduced and carries the hub 68 of the spring winder or spring tensioner means generally indicated as 70, (FIG. 5). The hub 68 of member 70 extends rearwardly and carries the spring wheel or actuator means 71 (FIG. 6). Preferably the assembly of members 70 and 71 includes a retainer washer 72 carried by the hub 68. Also carried by the main bearing axis is a timing gear 74, this gear preferably being carried on the hub 68 of spring tensioner 70. This timing gear includes a pin 75 which extends rearwardly and is adapted to engage a similar pin 76 which extends forwardly from the spring tensioner 70. This pin 76 also extends rearwardly of member 70 into a slot 77 formed in the switch actuating means 71. The timing gear 74 is also provided with a spiral return spring 78 for causing it to reset to the starting position when the clutch is released as will be explained.

Referring now to FIG. 10, the timing gear 74 is driven by the motor 14 which is mounted on motor plate 13. This motor includes a rearwardly extending pinion 80 meshing with a gear 81 carried on clutch shaft 82. Clutch shaft 82 is journaled in the motor plate 13 and extends rearwardly through a slot 83 in solenoid plate 10 (FIG. 11) and carries a clutch pinion 84 which meshes with a gear 85 carrying a pinion 86 which drives the timing gear 74. The gear-pinion combination 85–86 is carried by a stud 87 attached to the solenoid plate 10. The shaft 82 extends rearwardly beyond the pinion 84 and carries a roller 88 which is in the path of the clutch operating portion 62 of the switch operator 55. The shaft 82 is biased to the right by a tension spring 90 (FIG. 8). This tension spring tends to cause the clutch pinion 84 to engage clutch gear 85.

When motor 14 is in operation and clutch pinion 84 is engaging clutch gear 85, the motor drives the timing gear 74 in a counterclockwise direction. However when the clutch shaft 82 is pushed to the left as seen in FIG. 11, clutch pinion 84 disengages from gear 85, this permitting the return spring 78 to drive the timing gear clockwise to its starting position which is determined by the position of the pointer 18 on dial 24 (FIG. 2).

As shown in FIG. 1, the pointer 20 on the front of the timer is connected to the timing gear 74 by a drive shaft 92 which has one bearing in the front of the housing member 15 and another bearing in the solenoid plate 10. This drive shaft carries a gear 93 at its front end which meshes with the gear 23 attached to the pointer shaft 22. Drive shaft 92 at its rear end carries a gear 94 meshing with the timing gear 74. The pointer 20 is thus driven in the same direction as timing gear 74 and indicates the position of this timing gear on the dial 24. When the clutch is disengaged, the return spring 78 for the timing gear drives this gear clockwise which in turn drives the pointer 20 clockwise until it strikes the stop 19 on the adjusting pointer 18. Setting of the adjusting pointer 18 thus determines the starting position of the timing gear for a time cycle and thus controls the duration of the time cycle.

Referring now to FIGS. 6, 8 and 9, the switch actuator means 71 includes camming surfaces 96 and 97. Camming surface 96 cooperates with roller 61*a* on switch operator 55 and camming surface 97 cooperates with the roller 61 on switch operator 56. FIG. 8 shows the actuator means 71 in timing position. At this time, the switch operator rollers are not engaged by the camming surfaces and the switch operators are thus in their inner positions where the switch operating studs 52 apply no pressure to the switch blades 48. As a result when the parts are in the position shown in FIG. 8, the switches 5 and 6 are in their timing positions in which the movable contacts 50 engage the inner timing contacts 44. When the actuating means 71 shifts to its timed-out position, it is rotated counterclockwise to the position of FIG. 9 where the camming surfaces 96 and 97 drive their respective rollers outwardly causing the switches to be moved to the timed-out position. Rotation of the actuator means 71 on the main bearing axis 64 thus shifts the positions of the switches from timing to timed-out and vice versa.

The spring wheel 71 is pulled from the timing position of FIG. 8 to the timed-out position of FIG. 9 by a spring 99 (FIG. 8) this spring having its upper loop extending through hole 100 (FIG. 9) and its lower end fitting in hole 101 on spring tensioner 70. This spring tensioner 70 is also formed with a hole 102 receiving the end of the clutch spring 90. Clockwise movement of the spring wheel 71 by spring 99 is initially restrained by a timed-out latch 104 which is carried by the same stud 58 as carries the switch operator 56. This timed-out latch includes a hub portion 105 and a latching portion 106 which extends downwardly and inwardly under a forwardly extending L-shaped latching surface 107 on the spring wheel. The timed-out latch 104 also includes an operating lever portion 108 which extends over the spring tensioner 70 and is in the path of a forwardly extending pin 110 (FIG. 5) carried by the spring tensioner.

The spring wheel 71 when moved to the timed-out position is held there by means of a holding latch generally indicated as 111. This holding latch is also carried by the stud 58 and is located between the switch operator 56 and the timed-out latch 104. This holding latch includes a forwardly extending latch portion 112 which engages a holding latch surface 113 on the spring tensioner 70 when the parts are in the timed-out position as shown in FIG. 9. When the parts are in the timing position as shown in FIG. 8 the latching surface 112 engages a secondary latching surface 114 which limits the clockwise rotation of the spring tensioner 70. As shown more clearly in FIG. 13 the holding latch 111 also includes a latch actuating portion 115 which is actuated by the solenoid wheel 67. As will be described in greater detail later, the solenoid wheel 67 serves to lift the holding latch 111 causing this latch to release the spring wheel, this causing the timer parts to transfer from the timed-out position to the timing position.

Assuming now that the parts are in the timing position of FIG. 8, the assembly including spring tensioner 70 and the spring wheel 71 have rotated to their clockwise position in which further travel is prevented by latching surface 114 engaging latching surface 112 of the holding latch. At this time the latching surface 106 of the timed-out latch has come in under the latching surface 107 formed on the spring wheel 71. The spring 99 at this time has pulled the spring wheel 71 relative to the tensioner 70 until the edge of the slot 77 is in engagement with the pin 76 on the tensioner. It will be apparent that the assembly of tensioner 70 and the spring wheel 71 are effectively located by the latches 106 and 112. Latch 112 is limiting clockwise movement of the assembly whereas latch 106 is limiting counterclockwise rotation from the position shown. At this time the camming surfaces 96 and 97 are not in engagement with the rollers on the switch operators and the switches are therefore in the timing positions. The clutch operating arm 62 on the switch operator 55 is not in engagement with the roller 82 which has allowed the clutch pinion 84 to engage clutch gear 85 (see FIGS. 9 and 10). The motor 14 now drives the timing gear 74 in a counterclockwise direction about the main bearing axis 64 against the action of the return spring 78. The pointer 20 on the front of the timer rotates with the timing gear. When the timed-out position is reached, the pointer 20 is at the O-position on the dial. As this position is being approached the pin 75 on the timing gear engages the forwardly extending pin 76 on the spring tensioner and starts rotating this tensioner counterclockwise stretching the spring 99. The spring wheel 71 is initially restrained from moving by the timed-out latch 104 engaging the latching surface 107 on the wheel. After the spring 99 has been stretched, the pin 110 on the spring tensioner engages arm 108 of the timed-out latch 104 and starts moving it counterclockwise in releasing direction. Before the timed-out position is reached, the latching surface 113 on the tensioner rides under the holding latch surface 112 and the holding latch drops in place behind the tensioner. At the timed-out position, the timed-out latch 104 releases allowing the spring 99 to pull spring wheel 71 counterclockwise to the position shown in FIG. 9. Here the two switch operators have been cammed outwardly moving their respective switches or control devices to the timed-out positions. The switch operator 55 in moving to the timed-out position caused clutch operating arm 62 to engage the clutch roller 88 and move the clutch to the left to released position. Release of the clutch allows the reset spring 78 to drive timing gear 74 clockwise back to its starting position where the pointer 20 in front of the timer engages the reset stop 19 on setting pointer 18. While the gear portion of the timer mechanism resets instantaneously on reaching timed-out, the remainder of the mechanism remains in the timed-out position due to the holding latch 111 engaging latching surface 113 of the spring tensioner 70. From the foregoing it will be apparent that when the timer clutch is engaged and the motor energized, the timer will run from its timing position to the timed-out position at which time release of latch 104 causes all of the timer parts to shift to the timed-out positions with snap action. The timer clutch is released at this time and the timing mechanism resets ready for the next cycle. However the holding latch surface 113 maintains the operating mechanism in the timed-out position until such time as this latch is released. Release of this latch allows the timer switches to move back to timing position and also allows the timer clutch to re-engage.

Except for the holding latch the mechanism described thus far is disclosed in greater detail in my copending application Ser. No. 333,767. The invention claimed in this application includes the operation of the holding latch and clutch by the solenoid. Changing of the solenoid wheel 67 changes the manner in which the timer reacts to external control of the solenoid. Thus changing of the wheel provides different models of timers giving different results. Four specific applications will now be described.

ON-DELAY TIMER

FIG. 13 shows the setup an on-delay timer having one instantaneous switch and one delay switch. The master control means 67 is shown in the position assumed when the solenoid is out. The solenoid roller 35 is in the out position shown in full lines in FIG. 11. This roller bears against a curve 118 formed on the master controls means. The biasing spring 119 on hub 66 (FIG. 12) is set up to bias wheel 67 in a clockwise direction to its limit where stop lug 120 engages plate spacer 8. A clutch lug 121 formed on the wheel engages the clutch shaft 82 and has pushed this shaft to the left which holds the clutch disengaged. A latch lug 122 has cammed against the lifting surface 115 of the holding latch 111 and moved it to the released position of FIG. 8. This release of the holding latch 111 has caused the timer parts and switches to move to their inner or timing positions as shown in FIG. 8. A switch camming surface 123 is provided for engaging the large diameter roller 60 on the switch operator. In the position shown, this camming surface 123 is in its upper position and has allowed the switch operator to move into its timing position. The switch operator 55 is in its timing position and the clutch operating arm 62 is clear of the clutch operator 88.

Summarizing, due to the solenoid being in its out position, the holding latch has been released which caused the mechanism to assume timing position. However the clutch is released by solenoid lug 121 engaging clutch shaft 82.

Figure 14:
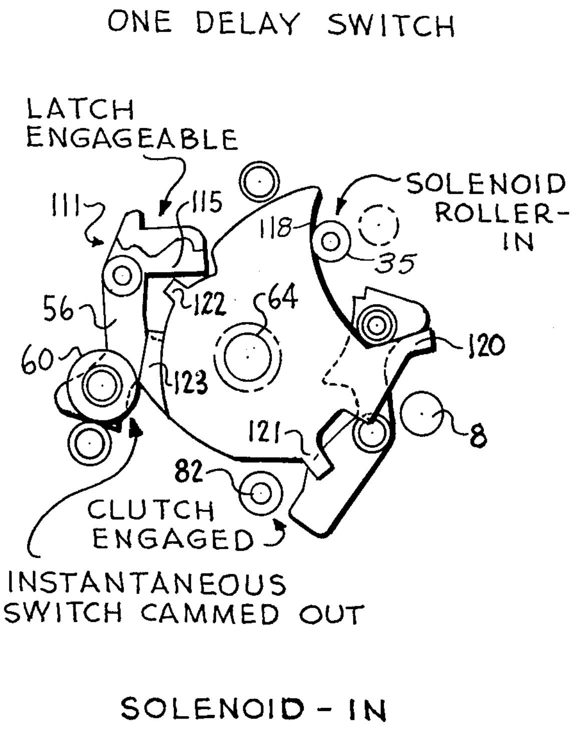

When the solenoid is energized, the roller 35 moves to the position shown in FIG. 14 which causes counterclockwise rotation of the solenoid wheel 67 about its main bearing axis 64. Stop 120 has moved away from spacer 8, clutch lug 121 has moved away from the clutch shaft 82, and latch operating lug 122 has moved away from the latch lifting surface 115 of latch 111. The clutch is therefore instantaneously engaged and the latch 111 is conditioned for holding the parts in the timed-out position when moved there by the timing mechanism. In addition the switch operating surface 123 instantaneously moved under the roller 60 causing instant shifting of the switch 6 (FIG. 3) operated by the switch operator 56. This instantaneous operation of the switch operator 56 makes the switch 6 usable as an interlock for holding the solenoid energized after momentary energization thereof. Due to the clutch being engaged, the timer motor runs the timer mechanism and at the end of the time cycle the operating mechanism shifts from the timing position of FIG. 8 to the timed-out position of FIG. 9. The switch operator 55 now moves its switch to the timed-out position and arm 62 disengages the clutch. The timing gear returns to its starting position but the mechanism is maintained in timed-out position by the holding latch 111. The parts will remain in this condition as long as the solenoid is energized. When the solenoid is deenergized, the biasing spring 119 (FIG. 12) drives the solenoid wheel 67 clockwise to the position of FIG. 13. This instantly transfers switch operator 56 back to its normal timing position, releases the holding latch 115, and holds the clutch released independently of the switch operator arm 62.

From the foregoing it will be apparent that the arrangement described provides an on-delay timer having one delay switch and one instantaneous switch. The delay switch does not transfer until the end of a period of time and will then remain in timed-out position as long as the solenoid is energized. When the solenoid is deenergized the instantaneous switch returns to its normal position and the delay switch returns to its timing position where it will stay until another time-delay period has been completed. It will be further apparent that the clutch will release and the timer reset itself anytime the solenoid is deenergized. Thus a power failure during a time cycle will cause the timer to reset.

OFF-DELAY TIMER

Figure 15:
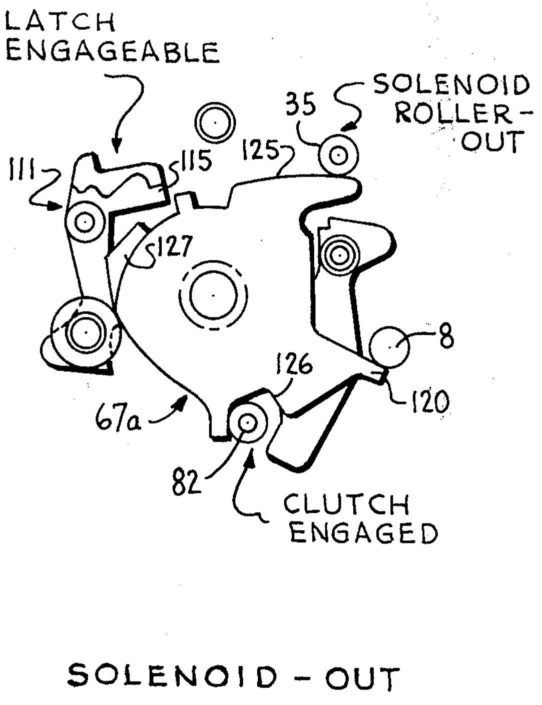
Figure 16:
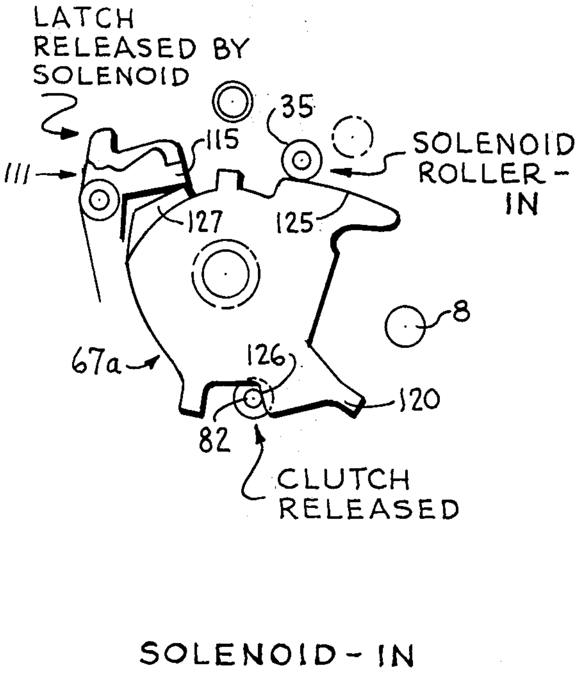

FIGS. 15 and 16 show the setup for an off-delay timer having two delay switches. In this setup, the solenoid wheel or master control means 67*a* is arranged to rotate counterclockwise by return spring 119 and to be rotated clockwise when the solenoid pulls in. FIGS. 16 shows the positions of the parts when the solenoid is in. Here the roller 35 has moved along camming surface 125 causing clockwise movement of wheel 67. This has moved the stop lug 120 away from the spacer 8, the clutch operating surface 126 has engaged clutch shaft 82 releasing the clutch, and latch releasing surface 127 has come under the lifting surface 115 of latch 111 causing this holding latch to be released. Thus when the solenoid is energized, the timer clutch is released and also the holding latch is released causing the parts to assume timing position as shown in FIG. 8. The parts will remain in this condition indefinitely until the solenoid is dropped out as shown in FIG. 15. Solenoid roller 35 moves from the full line position of FIG. 16 to the dotted line position shown. This allows counterclockwise movement of the solenoid wheel 67a causing the stop lug 120 to engage plate spacer 8. The clutch releasing surface 126 has moved away from the clutch shaft 82 allowing the clutch to engage, and the latch releasing surface 127 has moved away from lifting surface 115 of latch 111 which will permit this latch to assume latching position. This dropping out of the solenoid thus engages the clutch with the switches already in their timing positions. The timer will now run through its time cycle as shown in FIG. 8 to the timed out position of FIG. 9, the parts now being held in timed-out position indefinitely as long as the solenoid is deenergized.

When the solenoid is energized, it moves to its in position as shown in FIG. 16 which releases the holding latch 111 allowing the timer parts to return to the timing position. The clutch is now held released by the clutch surface 126 and thus the clutch will remain released until the solenoid is again dropped out to start a new timing cycle. Energization of the solenoid during the time cycle will release the clutch causing the timer to reset to the starting position.

INTERVAL TIMING

Figure 17:
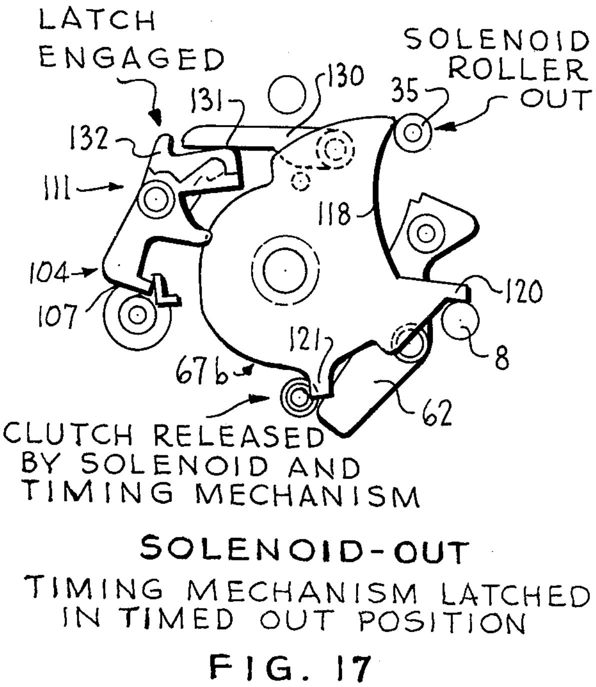
Figure 18:
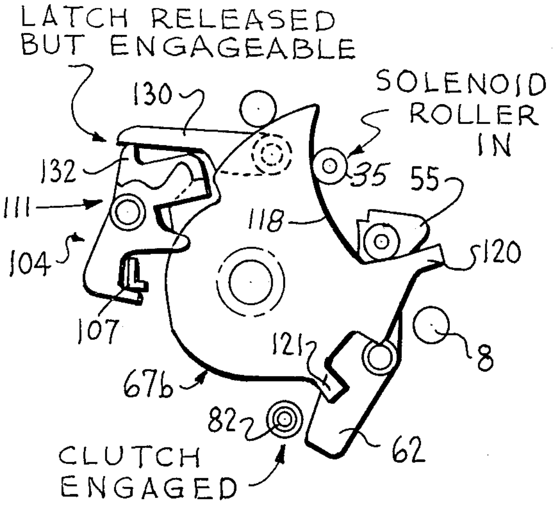

FIGS. 17 and 18 show the master control means setup for an interval timer in which both switches are actuated simultaneously to provide interval timing. FIG. 17 shows the positions assumed when the solenoid is out. The roller 35 is at the upper portion of curve 118 which has allowed the biasing spring 119 (FIG. 12) to rotate wheel 67b counterclockwise with stop lug 120 engaging spacer 8. Clutch lug 121 is engaging the clutch shaft 82 which has released the clutch. A special "non-repeat" latch releasing arm 130 is pivoted to the back of wheel **67*b* and extends to the left and rests on surface 131 of holding latch 111. The timing mechanism is in its timed-out position of FIG. 9 and the holding latch 111 is in latching position. when the solenoid is energized to start a time cycle, roller 35 moves inwardly and causes counterclockwise rotation of the solenoid wheel 67*b* which assumes the position shown in FIG. 18. During this movement, latch release lever 130 engaged lug 132 on holding latch 111 and rotated it counterclockwise to releasing position. After latch 111 was released, the surface 131 of the latch pushed arm 130 upwardly causing its end to clear lug 132. Arm 130 thus rode over lug 132 assuming the position shown in FIG. 18. It will be noted that latch 111** is now enabled to return to its latching position even though the solenoid is still energized.

When the solenoid was initially energized and released latch 111, the timing mechanism returned to timing position as shown in FIG. 8 with the timed-out latch 104 in latching engagement with the latching surface 107 on the spring wheel 71. The counterclockwise rotation of the solenoid wheel **67*b* also caused the stop lug 120 to disengage spacer 8 and the clutch lug 121 to move away from the clutch shaft 82. Also movement of the switch operator 55 to its timing position caused the clutch operating arm 62 to move away from clutch shaft 82. The clutch therefore engaged causing the timer to run through its timing cycle. At the end of the cycle, latch 111 again assumes latching position of FIG. 9 to hold the parts in timed-out position and the timed-out latch 104 releases allowing the spring 99 (FIG. 8) to rotate the timing parts to the timed-out position as shown in FIG. 9.**

The clutch will remain released by arm 62 and the switches will remain in timed-out position until the solenoid is first dropped out and then pulled back in. When the solenoid drops out release arm 130 reassumes the position shown in FIG. 17 which enables it to release the holding latch 111 when the solenoid is again energized. With the arrangements shown the solenoid must remain energized during the entire time cycle. If it drops out during the cycle as from a power failure the lug 121 on the wheel will release the clutch and the timing gear will return to the starting position.

If power failure reset is not desirable, the lug 121 may be omitted from the solenoid wheel **67*b*.** In such case the solenoid will not have any direct control over the clutch and the timer will hold its position in event of power failure.

COMBINATION INTERVAL AND ON-DELAY TIMER

Figure 19:
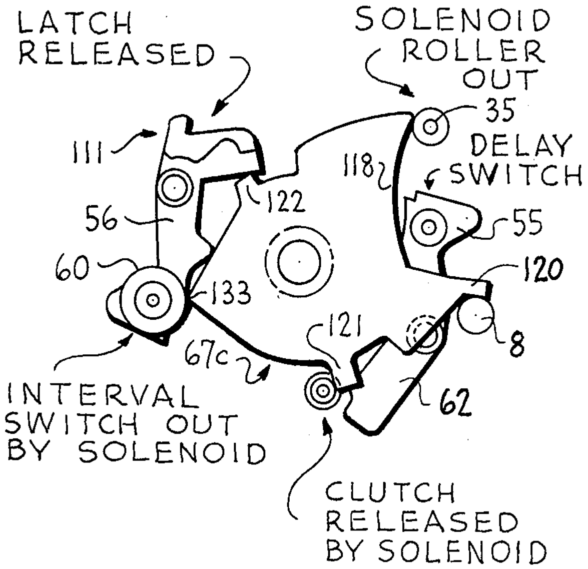
Figure 20:
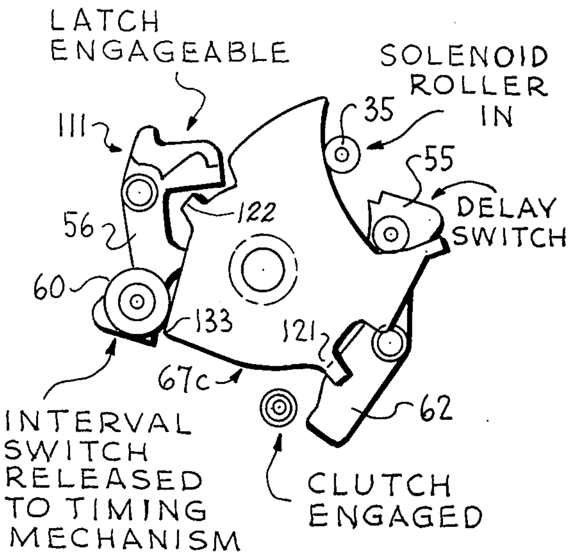

FIGS. 19 and 20 show a combination timer in which one switch is operated on the basis of delay timing and the other switch is operated on interval timing. The switch operator 55 is operated in exactly the same manner as explained in connection with FIGS. 13 and 14. However the switch operator 56 is caused to provide interval timing by a camming surface 133 on the solenoid wheel **67*c* engaging the enlarged roller 60 on the switch operator 56. When the solenoid is out this switch is held in the timed-out position by the solenoid wheel independently of the camming surface 97 on the spring wheel 71.**

With the parts in the position shown in FIG. 19 the solenoid is deenergized and wheel **67*c* has rotated to its clockwise limit in which stop lug 120 engages spacer 8. Clutch lug 121 has released the clutch, latch lug 122 has released latch 111 causing the timer parts to assume the timing position as shown in FIG. 8. Switch operator 56 is held in timed-out position by the camming surface 133 on the solenoid wheel. Thus switch operator 55 is in timing position whereas switch operator 56** is in timed-out position.

When the solenoid is energized, wheel 67c rotates counterclockwise to the position of FIG. 20 causing clutch lug 121 to allow engagement of the clutch and the latch lug 122 to allow engagement of holding latch 111. This same movement of the solenoid wheel 67 also moved the camming surface 133 away from roller 60 allowing instant transfer of switch operator 56 to the timing position. The timer now runs through its time cycle and both switches transfer to timed-out position of FIG. 8 and are retained there by engagement of the holding latch 111. When the solenoid is deenergized, the wheel **67*c* returns to the position shown in FIG. 19. Holding latch 111 is released allowing the switch operator 55 to move to timing position. However, the camming surface 133 on wheel 67*c* comes under the roller 60 of switch operator 56 and holds it in timed-out position independently of the spring wheel 71.**

Summarizing, the switch operator 55 functions as a delay switch. This switch moves instantly to timing position when the solenoid is deenergized. Thus when a new cycle is started by energizing the solenoid, this switch is already in timing position and does not move until the end of the time delay period. However, when the solenoid is deenergized it holds the switch operator 56 in timed-out position. When the solenoid is energized, the switch 56 immediately transfers to timing position for the time cycle and then transfers back to timed-out position at the end of the cycle. The switch operator 56 thus provides interval timing. This combination of interval timing and delay timing in the same timer can reduce circuitry in many applications.

From the foregoing it will be apparent that the present invention provides a simple and flexible means of controlling the clutch and switch operators. Simply changing the solenoid wheel and spring makes it possible to provide a wide variety of timer models with the same basic parts. It will also be apparent that in the arrangements shown provision is made for resetting the timer under the control of the solenoid. Where this type of operation is undesirable the solenoid lugs on the solenoid wheel may be omitted so that the clutch may remain engaged regardless of solenoid position.

While a preferred form of the invention is shown, it is obvious that numerous modifications may be made without departing from the spirit and scope of the invention as defined in the following claims.

I claim:

1. In a control mechanism, a main bearing axis, a control device, an operator for the control device, actuator means pivotally mounted on the main bearing axis arranged to engage and actuate said operator in one direction as said actuator means moves in one direction to a predetermined position, means for driving said actuator means to said predetermined position, means including latch means for holding said actuator means in said predetermined position, and master control means pivotally mounted on the main bearing axis and movable independently of said actuator means, said master control means being constructed and arranged to release the latch means on movement of the master control means to a predetermined position, and operating means for the master control means arranged to move same from one position to said predetermined position.

2. The combination recited in claim 1 in which the means for driving the actuator means includes automatic reset timing means having a clutch, and means controlled by the actuator means for releasing the clutch when the actuator means is in the predetermined position.

3. The combination recited in claim 1 in which the means for driving the actuator means includes automatic reset timing means having a clutch, said master control means also being arranged to control the clutch.

4. The combination recited in claim 1 in which the means for driving the actuator means includes automatic reset timing menas having a clutch, means controlled by the actuator means for releasing the clutch when the actuator means is in the predetermined position, said master control means also being arranged to release the clutch independently of said actuator means.

5. In an automatic reset timing device, the combination of, a main bearing axis, a rotatable tensioning means rotatably mounted on said main bearing axis, rotatable spring driven means also rotatably mounted on said main bearing axis, a spring having one portion moved by said tensioning means and another portion driving said spring driven means, timing means arranged to drive said tensioning means and cause movement of said driven means from a timing position to a timed-out position at a predetermined time, holding means for holding said driven means in said timed-out position, reciprocating master control means mounted on said main bearing axis, said master control means being movable on the main bearing axis in one direction from a neutral position to a releasing position, and also be movable in the opposite direction from the releasing position back to the neutral position, and means whereby the holding means is released by movement of the master control means to the releasing position.

6. The combination recited in claim 5 in which the timing means includes a clutch, and means for releasing the clutch actuated by said master control means.

7. The combination recited in claim 5 in which the holding means is a latch arranged to engage the driving means.

8. In a timing device, the combination of, a main bearing axis, a first control device, a second control device, a first operator for the control device, a second operator for the second control device, said operators having actuating portions laterally spaced from the main bearing axis, actuator means rotatably mounted on the main bearing axis, means including timing means for moving the actuator means from a timing position to a timed-out position at a predetermined time, means actuated by the actuator means for moving at least one of the operators, holding means for holding the actuator means in the timed-out position independently of the timing means, master control means pivotally mounted on the main bearing axis, said master control means being independent of the actuator means and constructed and arranged to release the holding means on movement of the master control means to a predetermined position.

9. The combination recited in claim 8 including means actuated by the master control means for actuating the other of said operators.

10. The combination recited in claim 8 in wich the actuating means is constructed and arranged to actuate both of said operators.

11. The combination recited in claim 10 in which the master control means also actuates one of said operators.

12. In an automatic reset timer, the combination of, a main bearing axis, a control device, a first operator arranged to operator the control device, spring return timing means including a clutch which when released allows reset of the timing means, a clutch operator arranged for operating the clutch, said operators having actuating portions located at angularly spaced points from the main bearing axis, actuator means driven by the timing means and pivotally mounted on the main bearing axis, said actuator means being arranged to cause actuation of said first operator in one direction as said actuator means is driven from a timing position to a timed-out position, means independent of the timing means for holding said actuator means in said timed-out position, and master control means pivotally mounted on the main bearing axis and movable independently of said actuator means, said master control means being constructed and arranged to release the holding means on movement of the master control means to a predetermined position.

13. The combination recited in claim 12 including means for releasing hte clutch when the actuator means is in the timed-out position.

14. The combination recited in claim 12 in which the master control means also actuates the clutch operator.

15. The combination recited in claim 13 in which the master control means also actuates the clutch operator.

* * * * *